Aug. 27, 1963   M. J. O'DEA   3,102,156
COMBINATION TEMPLE "NO-DROP" BRAKE AND SCREW GUARD
Filed Jan. 3, 1961
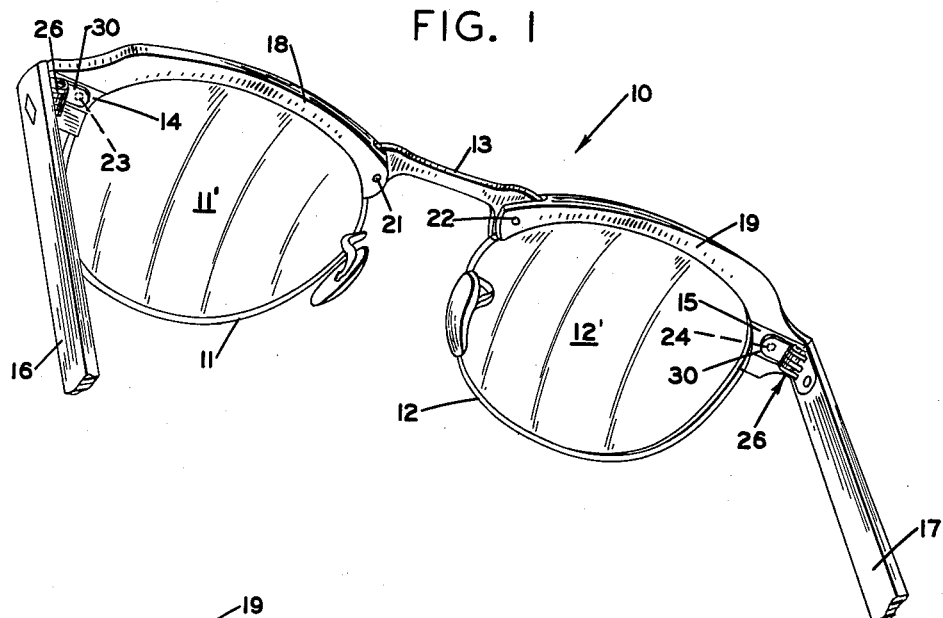
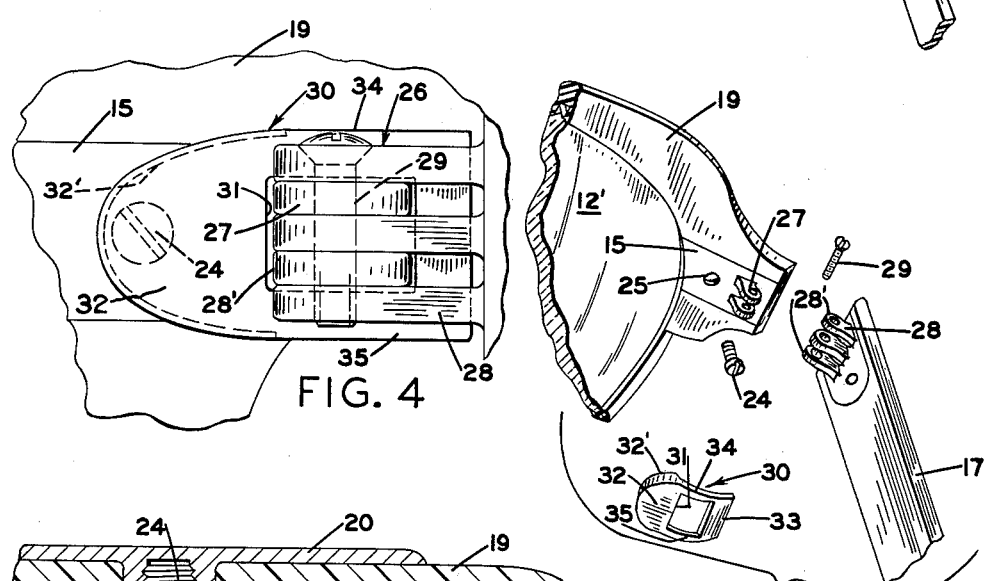
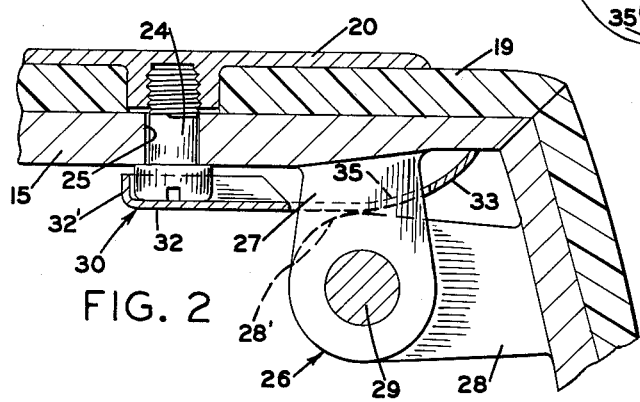
INVENTOR.
MARTIN J. O'DEA
BY Frank C. Parker
ATTORNEY United States Patent Office 3,102,156
Patented Aug. 27, 1963

3,102,156
COMBINATION TEMPLE "NO-DROP" BRAKE AND SCREW GUARD
Martin J. O'Dea, Rochester, N.Y., assignor to Bausch & Lomb Incorporated, Rochester, N.Y., a corporation of New York
Filed Jan. 3, 1961, Ser. No. 80,420
2 Claims. (Cl. 88—53)

The present invention relates generally to an ophthalmic mounting for lenses, and more particularly relates to improvements in the temporal parts of spectacles and the like.

It is an object of the present invention to provide novel improvements in spectacles and the like. A further object is to provide in a pair of spectacles a brake mechanism to prevent dropping of the temples when in open position. It is another object to provide such a mechanism in combination with mechanism for guarding against the loss of screws used in assembling a demountable part of said spectacles. Further objects and advantages reside in the arrangement and construction of the details of this invention as described and shown in the accompanying drawing wherein:

FIG. 1 is a general perspective view of a pair of spectacles having a preferred form of the invention constructed therein;

FIG. 2 is an enlarged sectional view of the temporal parts of one side of the spectacles shown in FIG. 1;

FIG. 3 is an enlarged exploded view in perspective of certain parts of the invention; and FIG. 4 is a front elevational view of the mechanism in FIG. 2.

The present invention is incorporated in a pair of spectacles of the type indicated generally by the numeral 10 in FIG. 1, said spectacles comprising a pair of lens rims 11 and 12 which hold lenses 11' and 12' and which are joined together in their nasal portions by a bridge member 13. On the temporal portions of said rims 11 and 12 are suitably fixed individual sidewardly extending plates 14 and 15 whereon a pair of temples 16 and 17 are mounted as described hereinafter. Over and around the top and temporal parts of said rims 11 and 12 and over the front side of each plate 14 and 15 are secured a pair of browpieces 18 and 19 which are fixed in any desired manner such as the pins 21 and 22 to the bridge 13. At their outer ends the browpieces 18 and 19 are preferably recessed to accommodate the plates 14 and 15 and are secured thereto by the screws 23 and 24, each of which extend through a clearance hole 25 formed in their respective plate and is threaded into an element of the browpiece such as the anchor plate 20 as shown in FIG. 2.

In the usual manner, each of the temples 16 and 17 is pivotally mounted on their respective plates 14 and 15 by means of a temple hinge 26. Each said hinge 26 is composed of two parts, a stationary hinge part 27 which is anchored in any preferred manner on its respective hinge plate, and a movable hinge part 28 which is fixed in any desired manner onto the butt end of said temple. These parts are united pivotally by a hinge screw or pin 29 secured therein in a conventional manner.

According to this invention, unitary or combination means are provided for coincidentally keeping the screw 24 from loosening in its anchor plate 20 while providing a braking mechanism for the pivotal motion of the temples 16 and 17.

In the preferred form, said means comprises a frictional brake member 30 formed of flat spring material and having approximately at its midportion an opening 31 therethrough which freely fits over the hinge part 27 to retain the member in operative position without necessitating any extraneous mechanism for this purpose. The inner ends 32 of the brake members 30 are extended to cover the heads of the retaining screws 24 and the opposite ends 33 of said members extend outwardly beyond the contiguous hinge parts 27 and are there seated against the respective mounting plates 14 and 15.

For the purpose of reinforcing or stiffening the end 32 of the brake member 30, a depending flange 32' is formed along the marginal edge of the end 32. The hinge 26 used herein is preferably of the type in which the movable hinge part 28 is wider than hinge part 27 so that the peripheries of the two outer elements of part 27 are located in free spaces. The terminal section 33 of the brake member is bent or curved laterally toward the plate in any desired configuration by an amount sufficient to position the midsection in contact with said peripheries of the temple hinge parts 28'. These peripheries are circular in form.

One of the advantageous features regarding the shape and combination of functions of the brake member 30 is the provision of two opposite spring elements 34 and 35 bordering the opening 31 which act as the frictional brake elements of the brake member 30 when forced against the peripheries of the hinge parts 28'. For the purpose of adjusting the required braking effect on the hinge parts 28', the spring brake elements 34 and 35 are curved or arched toward the hinge by a proper amount so as to bear against said hinge parts 28' with the desired braking force.

In order to assemble this device, the opening 31 of the braking member 30 is placed over the hinge part 27 with the round end 32 contacting the head of screw 24. The temple hinge part 28 is then engaged with its companion part 27 and forced against the pressure of the spring brake member 30, tending to straighten the member, until the parts of the hinge are aligned whereupon the hinge pin 29 is set into place.

With the above described simple movements, the brake member 30 is assembled to effectively act as a guard to prevent loosening of the screw 24 and to concurrently prevent the temples 16 and 17 from dropping when moved to open position. It will be seen further that the brake member 30 is self-aligning and misassembly thereof is very unlikely.

Although but a single embodiment of this invention has been shown and described in detail, other embodiments are possible and changes may be made in the form and arrangement of its parts without departing from the spirit of the invention as defined in the claims herebelow.

What is claimed is:

1. An ophthalmic frame comprising a lens mounting rim wherein an ophthalmic lens is secured, a plate extending sidewardly from and fixed to the temporal portion of said rim, a demountable browpiece secured upon said plate by a screw extending through the plate and having a head thereon seated against said plate, a temple hinge having a stationary part anchored to said plate adjacent to said screw and having a pivoted part fixed to a temple, the pivoted part being positioned externally of the outer faces of the stationary part and having a circular periphery on the ends of the pivoted part, a frictional brake member formed from flat spring material and seated at one end against said plate and at the other end against the head of said screw, the midportion of the brake member having an opening fitted around the stationary hinge part, whereby said member is held in operative position, the sides of the brake member adjacent to said opening being in contact with said circular periphery under spring pressure to act as a frictional brake against the circularly peripheral part of the temple hinge whereby said member primarily acts as a brake against motion of said temple and secondarily acts as a guard to prevent loosening of said screw member.

2. An ophthalmic frame according to claim 1 characterized by a stiffening flange formed around the end of the brake member adjacent to said screw, further characterized by a bend in said other end toward said plate whereby the midportion of said brake member is operatively spaced from said plate to apply spring pressure against said pivoted hinge part.

References Cited in the file of this patent

UNITED STATES PATENTS

| | | |
|---|---|---|
| 2,026,723 | Wollensak | Jan. 7, 1936 |
| 2,358,734 | Pankhurst | Sept. 19, 1944 |

FOREIGN PATENTS

| | | |
|---|---|---|
| 312,398 | Italy | Nov. 13, 1933 |